June 3, 1969  F. J. SOMES, JR  3,448,203
ELECTRICAL SYSTEM EQUIPMENT FOR FORMING
SAME, AND METHOD OF INSTALLATION
Filed March 28, 1967  Sheet 3 of 4

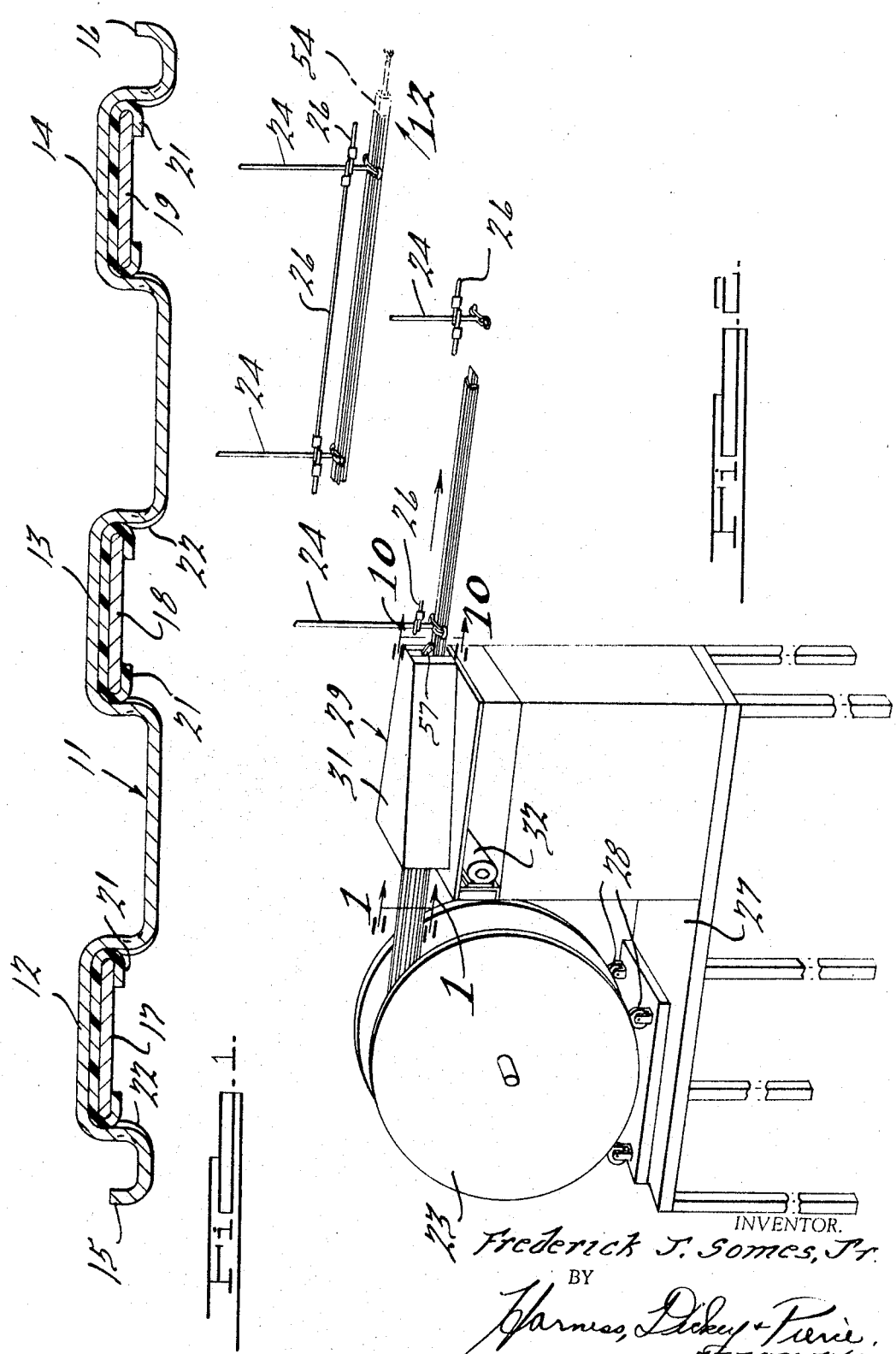

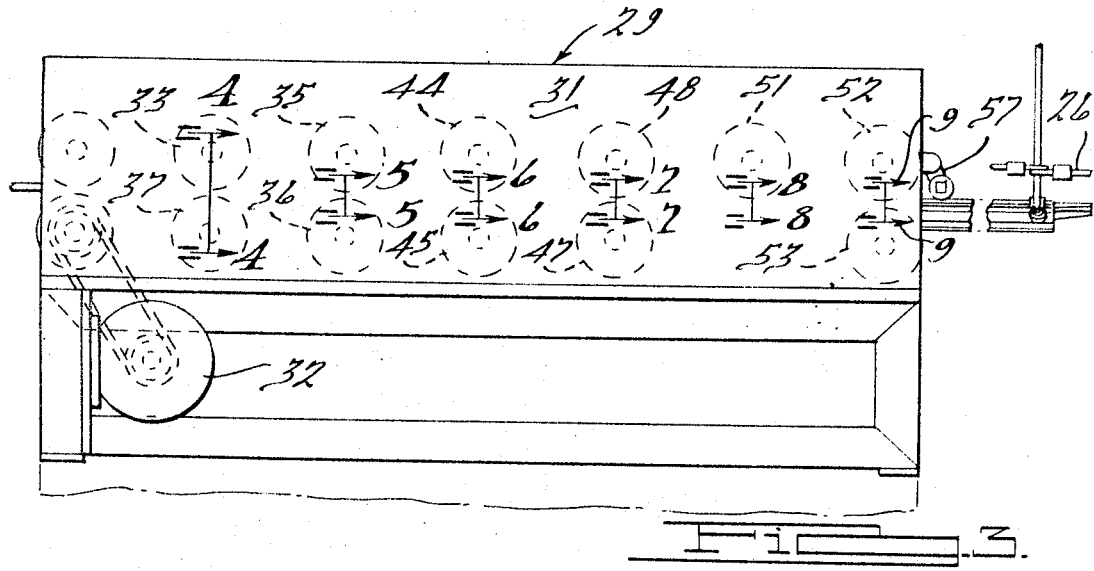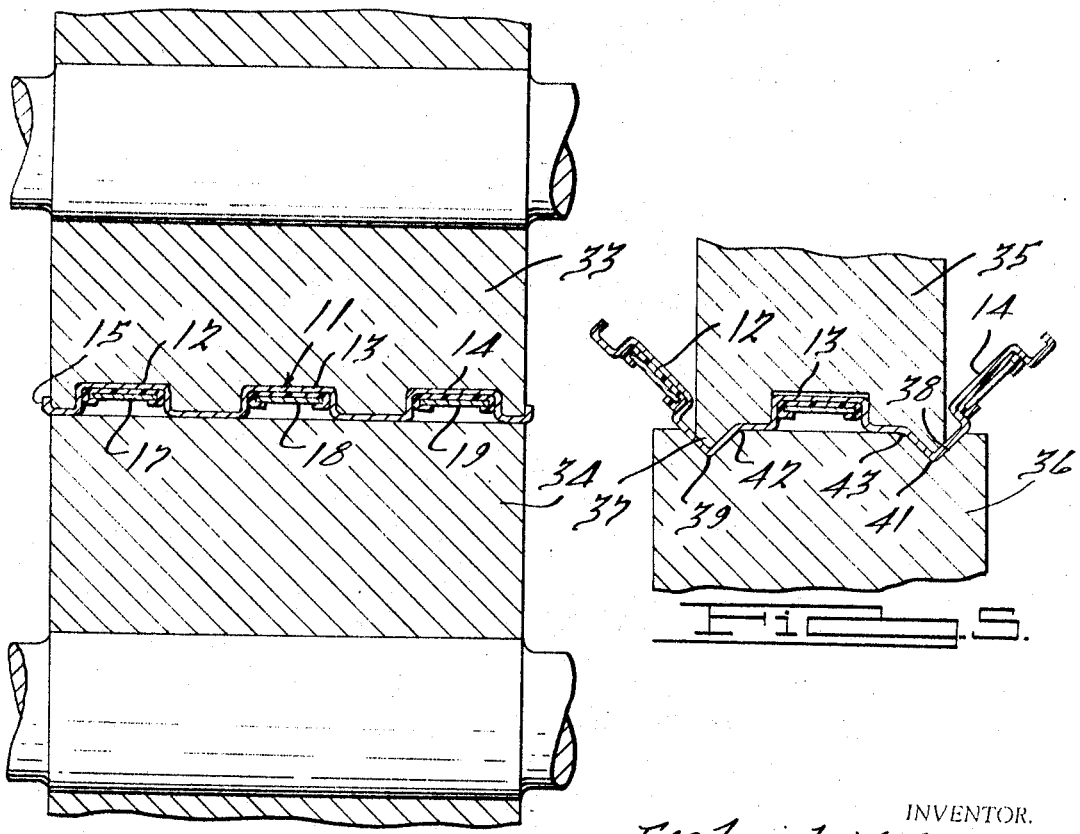

INVENTOR.
Frederick J. Somes, Jr.
BY
Harness, Dickey & Pierce
ATTORNEYS.

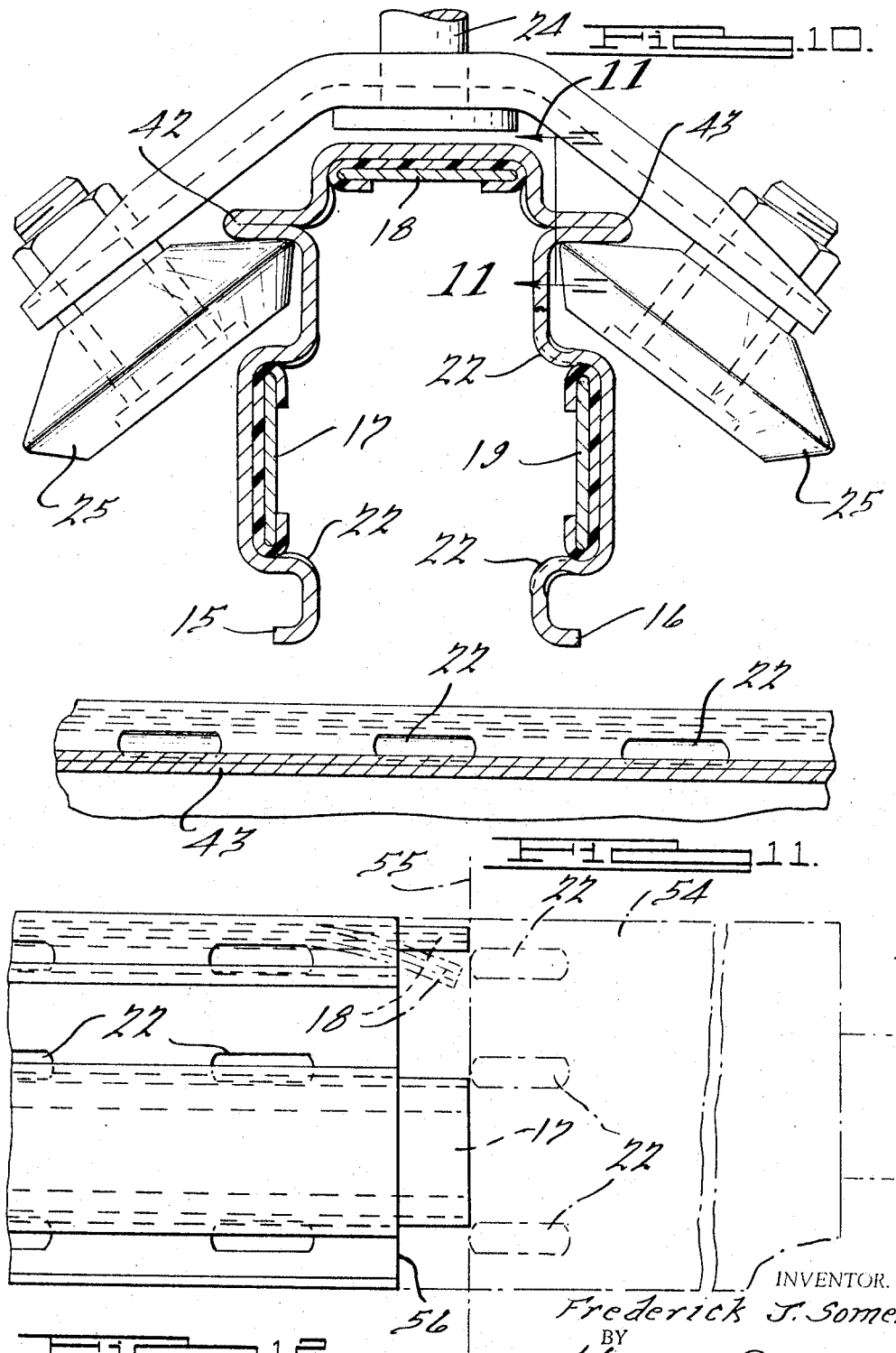

United States Patent Office 3,448,203
Patented June 3, 1969

3,448,203
ELECTRICAL SYSTEM, EQUIPMENT FOR FORMING SAME, AND METHOD OF INSTALLATION
Frederick J. Somes, Jr., 85 Duval, Grosse Pointe Shores, Mich. 48236
Filed Mar. 28, 1967, Ser. No. 626,577
Int. Cl. H02g 3/04, 7/00; B21d 5/08
U.S. Cl. 174—99               13 Claims

ABSTRACT OF THE DISCLOSURE

A metal strip having electrical conductors therealong is coiled on a reel. Desired lengths of said strip are pulled off the reel by a mechanism which also bends down the sides of the strip, thus forming a continuous housing which is fed through hangers to form a busway in an overhead electrical power distribution system.

BACKGROUND OF THE INVENTION

(1) Field of the invention

The invention pertains to overhead electrical power distribution systems in factories or the like, and particularly to the construction of ducts or busways for said systems and a method of manufacturing and installing such ducts.

(2) Description of the prior art

Prior overhead electrical power distribution systems of this type are exemplified by Somes Patent No. 2,953,626, issued September 20, 1960. They comprise elongated duct housings which carry electrical conductors, and lengths of which are secured together by mechanical and electrical couplings to form a busway. The housing lengths are prefabricated and shipped to the site in their final shape.

The prior busways thus require a large number of mechanical and electrical couplings which add considerably to their material and installation costs. The increased cost often makes it economically unfeasible to use waterproof couplings, so that the installations can only be made in a building after construction is made weathertight. Another problem with these prior constructions is that suppliers of the ducts can only ship them in standardized lengths, thus limiting the flexibility of the system as far as length is concerned. Moreover, ducts shipped in their final shape are prone to damage during shipping unless properly packaged.

Still another problem inherent in prior duct constructions is that the ducts must be installed in the hangers by pulling them through the hangers, with successive lengths being attached as the assembly is pulled along. This necessitates cables, winches and allied equipment for the pulling process, and is a slow and laborious operation.

SUMMARY OF THE INVENTION

According to the invention, a metal strip is made which is generally flat and has a plurality of downwardly open recesses therealong formed by offset portions. Electrical conductor strips are secured in these recesses by regularly spaced dimples formed in the housing strip, these conductor strips being insulated from the housing strip. The outside edges of the strip have upturned flanges.

This entire assembly is coiled onto a reel, the length of the coiled strip being many times the average length of individual housing sections of the prior art ducts described above. The reel is thus shipped as a package either to the building where the duct is to be installed or to a warehouse.

When it is desired to install a duct in a building, hangers are placed in the usual manner in the building, and a forming and feedout unit is provided having a series of driven rolls. The strip is fed from the reel into these rolls, which are at an elevation aligned with the hangers. The rolls pull the strip off the reel, straightening it, but at the same time bending down the outside portions of the strip to form sides of a downwardly open duct, the edge flanges now facing outwardly for the attachment of fixtures or other accessories. The electrical conductors are exposed to the housing interior. During the forming process, the rolls also form two outwardly extending portions along the upper sides of the duct, by reverse bending, these portions being supported by the hangers. The duct can thus be run out through the hangers to any desired length, without the need for mechanical or electrical connectors except in cases where the total length of a busway is greater than the length of the duct formed by one complete coil.

The aforesaid dimples not only act to retain the electrical conductors but may also be used to actuate a counting mechanism which will indicate the length of duct run out. To connect the conductors to a power source, the duct housing and conductors are cut through immediately behind a set of dimples, the conductors are bent away from the housing, that portion of the housing adjacent the inwardly bent conductors is cut away, and the conductors are then exposed for use in making the connection.

The forming and feedout unit may also be utilized in a warehouse to form a duct of any desired length which may then be shipped to the customer.

The invention thus not only permits an overhead electrical power distribution system to be installed at a much lower cost, but allows such system to be constructed while a building is still under construction and before it is weathertight. Furthermore, the continuous nature of the duct will result in greater strength for supporting fixtures and other equipment.

BRIEF DESCRIPTION OF THE DRAWINGS

FIGURE 1 is a cross-sectional view in elevation of the duct strip as it is coiled on the reel for shipping, the section being taken along the line 1—1 of FIGURE 2;

FIGURE 2 is a perspective view of the reel positioned adjacent the forming and feedout unit which is aligned with hangers in the building ready to receive the formed duct;

FIGURE 3 is an enlarged side elevational view of the forming and feedout unit showing the location of the rolls and the counter;

FIGURE 4 is a fragmentary cross-sectional view taken along the line 4—4 of FIGURE 3 and showing the cross-sectional shape of mating portions of the first and second sets of rolls in the forming and feedout unit;

FIGURE 5 is a fragmentary cross-sectional view taken along the line 5—5 of FIGURE 3 of the mating portions of the third set of rolls which partially form the juncture between the top and sides of the finished product;

FIGURE 10 is an enlarged cross-sectional view of the finished duct taken along the line 10—10 of FIGURE 2 and showing the manner in which the duct is supported by a hanger;

Figure 6:
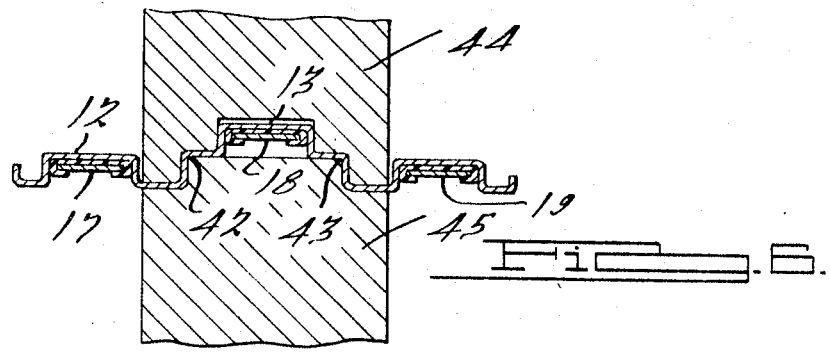
FIGURE 6 is a fragmentary cross-sectional view taken along the line 6—6 of FIGURE 3 and showing the mating portions of the next set of rolls which further bend the junctures toward their final shape.

FIGURE 11 is a fragmentary cross-sectional view in elevation taken along the line 11—11 of FIGURE 10 and showing the locations of the dimples which retain the conductors in place, and FIGURE 12 is a view taken in the direction of the arrow 12 of FIGURE 2, and showing the manner in which the conductors at one end of the duct may be connected to a source of electrical power.

DESCRIPTION OF THE PREFERRED EMBODIMENT

The duct housing strip is generally indicated at 11 and is made of a metal such as aluminum. The strip is of generally flat cross-sectional configuration, but has three flat offset portions 12, 13 and 14 which are in a common plane parallel to but spaced from the main body of the strip. The side edges of strip 11 are bent at right angles to the main body of the strip to form flanges 15 and 16. The height of these flanges is less than the distance of portions 12, 13 and 14 from the main strip body.

Three electrical conductors 17, 18 and 19 are disposed in the recesses formed by offset portions 12, 13 and 14 respectively. These conductors could also be formed of aluminum so that the conductors and housing will not be subject to relative longitudinal movement due to temperature changes. Conductors 17, 18 and 19 are of flat cross-sectional shape and each is partially encased in a dielectric material 21 so as to insulate them from strip 11. This material does not cover the surfaces of strips 17, 18 and 19 which face away from sections 12, 13 and 14 respectively, so that the conductor strips will be exposed for use.

The total thickness of each conductor strip 17, 18 and 19 and its accompanying insulating material 21 is substantially less than the depth of the recess formed by offset portion 12, 13 or 14. The conductor strips and their insulative material are retained in these recesses by dimples indicated at 22. The shape and location of these dimples are best seen in FIGURES 11 and 12. The dimples are formed in the junctures of the offset portions with the main body of strip 11, so that there are two rows of dimples 22 for each conductor strip, these two rows retaining the opposite edges of the conductor strip by being pressed inwardly from the aforesaid junctures.

The dimples 22 in each row are at regularly spaced intervals, and each dimple in each row is aligned with corresponding dimples in all the other rows, as seen particularly in FIGURE 12, so that in the spaces between successive dimples the conductors are not positively retained in their recesses.

The assembly comprising duct strip 11, conductors 17, 18 and 19 and insulative material 21, fabricated as shown in FIGURE 1, is coiled on a reel 23. Any desired length of this assembly may be coiled onto the reel, but normally the length will be many times greater than the average length of prefabricated duct sections used in prior systems of this type. Reel 23 will then be shipped to a fabrication site which may be either a warehouse or a building where it is desired to install the overhead electrical power distribution system.

FIGURE 2 shows the duct strip assembly being finally formed and installed in a building (not shown). The trusses or other overhead members of the building are provided in a normal manner with hangers 24 which extend downwardly therefrom and have spaced-apart rollers 25 for receiving and supporting the duct. Similar rollers are shown in the aforementioned Patent No. 2,953,626. The hangers are positioned in spaced relation along with the path of the intended duct, and are provided with appropriate means 26 for holding them in position.

Reel 23 is mounted on a raised platform 27 which carries four rollers 28 supporting the reel for rotation on a horizontal axis. The height of platform 27 is such that the upper portion of the reel will be approximately aligned with the lower portions of hangers 24. A forming and feedout unit 29 is also mounted on platform 27 forwardly of reel 23. This unit comprises an elongated housing 31 which is open at both ends, and a plurality of sets of forming and feedout rolls within the housing, said rolls being driven through proper gearing (not shown) by a motor 32.

More particularly, the illustrated embodiment shows seven sets of rolls, and they are adapted not only to pull strip 11 off reel 23 and straighten it, but also to progressively bend down the side portions of the strip and form outwardly extending reversely bent portions between said side portions and the central strip portion.

Figure 7:
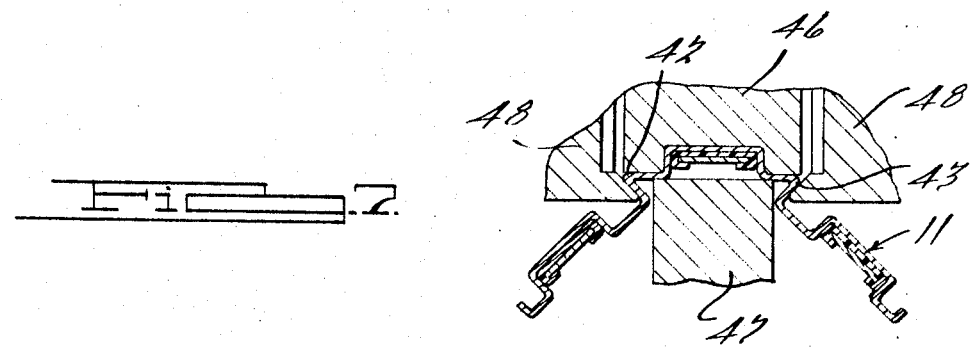
FIGURE 7 is a fragmentary cross-sectional view taken along the line 7—7 of FIGURE 3 and showing the mating portions of the fifth set of rolls which start the junctures toward their final reversely bent shape.
Figure 8:
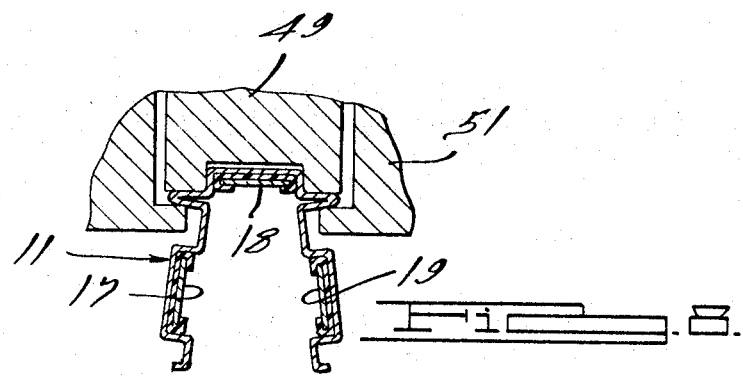
FIGURE 8 is a fragmentary cross-sectional view taken along the line 8—8 of FIGURE 3 and showing mating portions of the next set of rolls which make further progress in the reverse bending of the junctures.
Figure 9:
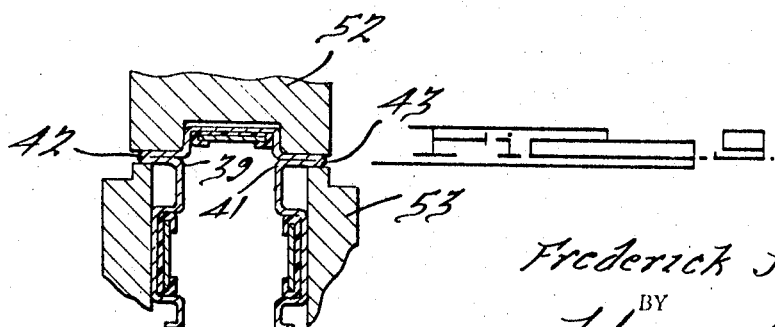
FIGURE 9 is a fragmentary cross-sectional view taken along the line 9—9 of FIGURE 3 and showing mating portions of the final set of rolls which complete the formation of the junctures.

The manner in which this is done is shown in FIGURES 4 through 9. FIGURE 4 shows a pair of rolls 33 and 34 the shape of which is the same at the first and second roll stations in unit 29. The upper roll 33 has a shape complementary to the upper surface of strip 11 while the lower roll 34 has a cylindrical surface. Rolls 33 and 34 will therefore drive the strip assembly through housing 31. The next set of rolls 35 and 36 are shown in FIGURE 5. The upper roll 35 has protruding side edges 37 while the roller roll 36 has corresponding recesses 38. This will cause a V-shaped (right angle) bend to be produced in the material indicated at 39 and 41, which portions are between the center conductor 18 and the side conductors 17 and 19. Rolls 35 and 36 also create bends at points 42 and 43 which are inwardly of portions 39 and 41, respectively.

The next set of rolls 44 and 45 (in FIGURE 6) will complete bends 42 and 43 to right angle bends, while the succeeding set 46, 47 and 48 (FIGURE 7) will bend portions 42 and 43 to acute angles. At the next station, rolls 49 and 51 will sharpen this acute angle, while the final set of rolls 52 and 53 will squeeze these junctures 42 and 43 until they are completely reverse bends which project outwardly from the upper side portions of the finished duct assembly. As seen in FIGURE 10, portions 42 and 43 of the duct will thus be engageable by rollers 25 so that the latter may support the duct.

In its final shape, the general configuration of the cross section of strip 11 will be that of an inverted U, that is, it will be open downwardly, with conductor strips 17, 18 and 19 facing the space enclosed by the duct housing. Flanges 15 and 16 will extend outwardly so as to provide means for mounting accessories in the normal manner. Dimples 22 will be undisturbed by the forming process and will still act to retain conductors 17, 18 and 19 in place. The relatively great depth, in a vertical direction, of the cross section of the duct assembly will mean that it will have substantial beam strength, especially since it is continuous and does not have couplings or connectors at frequent intervals.

As the duct is fed outwardly from the exit of housing 31 it will pass through the pairs of rollers 25 in successive hangers 24, being guided through the hangers if necessary by any appropriate means (not shown). In this manner the entire strip coiled on reel 23 may be unwound from the reel, straightened, formed and fed through the hangers without the necessity of either electrical or mechanical connections, so that the feeding may be continuously accomplished.

FIGURE 12 shows the manner in which a connector 54 or other source of electrical power may be connected to one end of the duct assembly. First, the duct assembly is cut at a plane 55 which is immediately behind a set of dimples 22. The conductors 17, 18 and 19 are then bent inwardly from the housing, these conductors being free for bending since they are not restrained by any dimples for some distance. The bending of conductor 18 is shown in dot-dash lines in FIGURE 12. The duct housing (but not the conductors) is then cut in a plane 56 which is some distance back from the plane 55, but before the next set of dimples 22. This will expose conductors 17, 18 and 19, which may be bared and rebent as necessary to be secured to connector 54.

FIGURES 2 and 3 show a counter 57 which may be mounted above the exit of forming and feedout unit 29. This counter is engageable with dimples 22 of any row, and since the dimples have regular spacing, counter 57 may be used to measure the total length of the duct being formed.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a method for manufacturing and installing a duct for an electric power distribution system of the type to be supported by elevated supporting means therealong, the steps of forming a duct housing at an installation site in a continuous manner at the same elevation as said supporting means while simultaneously enclosing at least one electrical conductor in said housing, and feeding said formed housing onto said supporting means.

2. In a method for manufacturing and installing a duct for an electric power distribution system of the type to be supported by elevated supporting means therealong, the steps of forming a duct housing strip of generally flat cross-sectional configuration, coiling said strip, transporting said strip while so coiled to an installation site, uncoiling and feeding out said strip from said coil in a continuous manner at the same elevation as said supporting means while simultaneously forming said strip into a housing, enclosing at least one electrical conductor in said housing, and feeding said formed housing onto said supporting means.

3. In a method for manufacturing and installing a duct for an electric power distribution system of the type to be supported by supporting means therealong, the steps of forming a duct housing strip of generally flat cross-sectional configuration, with at least one conductor secured therealong but insulated therefrom, coiling said strip with its attached conductor, transporting said strip while so coiled to a fabrication site, uncoiling and feeding out said strip from said coil, and bending said strip during said feedout to form a duct housing with said conductor inside the housing.

4. In a method of manufacturing and installing a duct for an electrical power distribution system of the type supported by overhead retaining means, the steps of forming a duct housing strip of generally flat cross-sectional configuration with at least two spaced parallel electrical conductors secured therealong but insulated therefrom, coiling said strip with its attached conductors, transporting said strip while so coiled to a fabrication site, uncoiling and feeding out said strip from said coil, and bending the side portions of said strip downwardly from the central portion thereof during said feedout to form a downwardly open duct housing with said conductors facing the inside of the duct housing.

5. The method according to claim 4, further including the step of forming a pair of outwardly extending reversely bent portions on the upper side portions of said duct housing simultaneously with the bending down of said duct side portions, and feeding said duct housing through said overhead retaining means so that said outwardly extending portions are supported thereby.

6. The method according to claim 5, in which said generally flat duct housing strip is formed with three spaced parallel conductors secured therealong but insulated therefrom, the bending down of said side portions being such that the central one of said three conductors is at the central portion of said strip and the other two conductors are on the side portions of said strip below said outwardly extending reversely bent portions.

7. The method according to claim 5, further including the step of forming at least two spaced parallel recesses in said duct housing strip before it is coiled, placing said conductors in said recesses, and forming rows of regularly spaced dimples along said strip adjacent said recesses to retain said conductors in said recesses.

8. In a method for manufacturing and installing an electrical duct housing of the type retained by overhead supporting means, the steps of forming a continuous metal strip of generally flat configuration but with at least two spaced parallel flat offset portions creating recesses facing in one direction, placing flat electrical conductor strips in said recesses insulated from the housing strip, forming regularly spaced dimples at the junctures of said housing strip with its offset portions to retain said conductor strips in position, forming upwardly extending flanges along the opposite edges of said housing strip, coiling said housing strip with its attached conductor strips, transporting said coiled assembly to a fabrication side, uncoiling and straightening said assembly while simultaneously bending the side portions of said strip downwardly from the central portion thereof to form a downwardly open housing duct with the electrical conductors facing the inside thereof and said edge flanges facing outwardly, creating outwardly extending reversely bent portions on the upper side portions of said duct housing while bending said side portions downwardly, and feeding said duct housing through said retaining means so that the retaining means will engage and support said outwardly extending reversely bent portions.

9. The method according to claim 8, further including the step of forming three portions in said original flat strip with said three portions all being in a common plane whereby three recesses are formed, and placing three conductors in said recesses, whereby the two outside conductors will be carried by the sides of the finally formed duct housing and the central conductor will be carried by the upper central portion of the housing, said outwardly extending reversely bent portions being formed between said central and side conductors.

10. Apparatus for forming a continuous electrical duct housing to be supported by overhead retaining means from a coiled duct housing strip having a generally flat cross-sectional configuration but with a plurality of flat offset portions forming recesses which carry conductor strips insulated from the duct housing strip, said apparatus comprising a forming and feedout unit having a housing open at both ends and a plurality of sets of rolls therein, means for driving at least some of said rolls, the shapes of successive sets of rolls forming the flat strip which is uncoiled and fed therethrough by bending the sides of said strip downwardly to form a downwardly open duct housing and forming outwardly extending reversely bent portions at the upper side portions of said housing engageable with said overhead retaining means.

11. In a construction for a continuous electrical duct assembly of the type to be supported by supporting means therealong, a housing having a central portion and at least one side portion extending vertically therefrom, at least one of said portions having an outwardly extending recess, a conductor strip in said recess, and a series of spaced dimples formed in said housing portion and retaining said conductor strip within said recess.

12. In a construction for a continuous electrical duct assembly of the type to be supported by overhead retaining means, a metal housing having a central portion and downwardly extending side portions, the central portion and at least one of the side portions having outwardly extending recesses, conductor strips in said recesses, regularly spaced sets of dimples at the junctures of said recesses and the main portion of said housing retaining said conductor strips in said recesses, each dimple in each row being aligned with other dimples in the other rows, and outwardly extending flanges at the lower edges of said housing sides.

13. The combination according to claim 12, said housing being further provided with outwardly extending reversely bent portions along its upper sides.

References Cited

UNITED STATES PATENTS

| 2,158,656 | 5/1939 | Frank | 72—181 X |
|---|---|---|---|
| 2,585,043 | 2/1952 | Sandberg. | |
| 2,953,626 | 9/1960 | Somes. | |
| 2,968,782 | 1/1961 | Herrmann et al. | |
| 2,969,438 | 1/1961 | Herrmann et al. | |
| 3,181,102 | 4/1965 | Fehr. | |

LARAMIE E. ASKIN, *Primary Examiner.*

U.S. Cl. X.R.

29—202.5, 509, 624; 72—181; 174—40; 191—23; 254—134.3; 339—22